United States Patent [19]

Brown et al.

[11] 4,299,284
[45] Nov. 10, 1981

[54] HIGH SWEEP EFFICIENCY ENHANCED OIL RECOVERY PROCESS

[75] Inventors: Alfred Brown; Mohan V. Kudchadker, both of Houston; James E. Varnon, Midland; Lawrence E. Whittington, Katy, all of Tex.

[73] Assignee: Texaco Inc., White Plains, N.Y.

[21] Appl. No.: 100,683

[22] Filed: Dec. 5, 1979

[51] Int. Cl.³ .................... E21B 33/138; E21B 43/22; E21B 43/30

[52] U.S. Cl. .................................. 166/245; 166/263; 166/294

[58] Field of Search ............... 166/245, 263, 268, 274, 166/294

[56] References Cited

U.S. PATENT DOCUMENTS

| | | | |
|---|---|---|---|
| 3,074,481 | 1/1963 | Habermann | 166/245 |
| 3,593,787 | 7/1971 | Hoyt | 166/245 |
| 3,604,506 | 9/1971 | Hoyt | 166/245 |
| 3,608,635 | 9/1971 | Hoyt | 166/245 |
| 3,672,448 | 6/1972 | Hoyt | 166/245 |
| 4,160,480 | 7/1979 | Schievelbein et al. | 166/269 |
| 4,175,618 | 11/1979 | Wu et al. | 166/263 X |
| 4,192,382 | 3/1980 | Schievelbein | 166/294 X |

*Primary Examiner*—James A. Leppink
*Assistant Examiner*—George A. Suchfield
*Attorney, Agent, or Firm*—Carl G. Ries; Robert A. Kulason; Jack H. Park

[57] ABSTRACT

Disclosed is a method for conducting an enhanced oil recovery process comprising injecting an oil displacing fluid into an injection well and recovering petroleum displaced by the fluid from one or more spaced-apart production wells, by an improved method in which the sweep efficiency or horizontal conformance of the displacement process is increased. A fluid is injected into the producing well, which fluid has a viscosity not substantially greater than the viscosity of water at the conditions of injection, but which reacts with oil present in the formation, forming a viscous emulsion which restricts the flow of fluids through the portion of the formation contacted by the emulsion-forming fluid. As a result of this treatment, there is a reduction in tendency for the displaced and injected fluids to form cusps as they approach the production well, thereby failing to sweep substantial portions of the formation. The injected fluid contains one or more surfactants specifically tailored to form a viscous emulsion with the particular formation crude oil and formation water or brine exhibiting maximum viscosity at formation conditions. The viscous emulsion-forming fluid may be injected into all of a group of wells surrounding a central injection well in approximately equal amounts, for the purpose of improving sweep efficiency, or the treatment may be selectively applied to certain of the wells where the formation exhibits a preferred direction of permeability, or where for other reasons the pattern integrity is poor.

25 Claims, 5 Drawing Figures

⌀ INJECTION WELL
○ PRODUCTION WELL

▨ TREATED AREA

▨ SWEPT AREA

☐ UNSWEPT AREA

HIGH SWEEP EFFICIENCY ENHANCED OIL RECOVERY PROCESS

FIELD OF THE INVENTION

The present invention concerns a process applied to one or more producing wells in a formation being stimulated by an enhanced recovery method in which an oil displacing fluid is injected into one or more injection wells and fluids including formation petroleum and the injected fluids are recovered from one or more spaced-apart production wells. More specifically, the invention is concerned with a method whereby a diverting agent is injected into at least one producing well to improve the vertical and/or horizontal conformance or pattern integrity of the enhanced recovery process.

BACKGROUND OF THE INVENTION

Many prior art references teach methods for increasing the amount of oil recoverable from a subterranean earth formation containing oil or petroleum by methods described in the art as secondary recovery, tertiary recovery, enhanced recovery, supplemental recovery, etc., all of which share the common feature of employing an injected fluid which displaces oil from the flow channels or the formation, and displaces it toward one or more spaced-apart producing wells. Fluids employed for this process include water, steam, water containing chemical additives including surface active agents or surfactants, as well as viscosity increasing hydrophilic polymers, all of which are known and used for the purpose of increasing the amount of oil recoverable from subterranean formations. All enhanced recovery processes employing a fluid which is injected into one or more wells to displace petroleum toward one or more spaced-apart production wells, have experienced only limited success because of a number of problems which are encountered in applying the process. One serious problem which has been encountered is concerned with the failure of the injected fluid to sweep as large a segment of the formation as is expected. One commonly used pattern called an inverted five spot, comprises an injection well located in the center of a more or less square grid and four production wells surround the injection well, one located at each corner of the square. When water or other oil displacing fluids are injected into the central injection well, oil is displaced only from the portions of the formation swept by the injected fluid which is only about 70% of the total area of the pattern. The failure to sweep all of the area within the square is referred to as poor sweep efficiency or poor horizontal conformance.

Numerous processes have been disclosed in the literature for the purpose of improving the sweep efficiency of a displacement type enhanced oil recovery process. Numerous complex patterns and multi step processes have been disclosed, by means of which the amount of formation swept by the injected fluid is increased, but cost of drilling the additional wells required is frequently excessive in relation to the improvement in sweep efficiency attained. None of these procedures have been entirely satisfactory.

In view of the current shortage of petroleum products, there is a substantial need for a method which will improve the sweep efficiency of displacement type enhanced oil recovery processes without requiring the drilling of additional wells above those normally employed in conventional enhanced oil recovery techniques.

PRIOR ART

U.S. Pat. Nos. 3,557,872 and 3,537,527 described methods for increasing the sweep efficiency of an enhanced oil recovery process employing one or more injection wells and one or more production wells involving the injection of a viscous fluid into an extra well penetrating the formation between the injection well and the production well, to reduce cusping of the displaced petroleum by the injected fluid.

U.S. Pat. Nos. 4,159,037; 4,161,218; 4,161,480; 4,161,982; 4,161,983 and copending application Ser. No. 863,508 filed Dec. 22, 1977, now U.S. Pat. No. 4,184,549 describe methods for increasing the horizontal conformance of a displacement type oil recovery method by injecting low viscosity fluids into the injection well after one or more high permeability zones have been depleted by injecting an oil recovery fluid, the low viscosity fluid forming an emulsion with the residual oil remaining in the previously swept zones, after which oil-displacing fluids may again be injected into the injection well and will as a consequence of the prior treatment, invade lower permeability, oil containing zones bypassed in the first phase of the enhanced oil recovery method.

SUMMARY OF THE INVENTION

Briefly, the process of our invention utilizes a method comprising treating one or more production wells by injecting thereinto an aqueous fluid which is of relatively low viscosity at the time of injection, said fluid containing one or more surfactants which form viscous emulsions on contacting petroleum or oil present in the portions of the formation into which they are injected, thereby reducing the permeability of the treated portion of the formation. In one embodiment of the process of our invention, this technique is applied more or less equally to all of a group of producing wells surrounding an injection well, thereby improving the sweep efficiency or horizontal conformance of a displacement type enhanced oil recovery process. In another embodiment of the process of our invention, the diverter fluid injection treatment is applied selectively or unequally to a group of producing wells surrounding a central injection well, for the purpose of improving the symmetry of the swept area, to offset naturally occurring conditions in a formation which cause unsymmetrical swept areas. For example, formations exhibiting preferred permeability orientation will experience not only the normal poor horizontal conformance or poor sweep efficiency, as is experienced in an ordinary formation with relatively equal distribution of permeability, but additionally experience even worse sweep efficiency because of the tendency for the displaced and injected fluids to move very rapidly toward the producing wells in the direction of preferred formation permeability, with significantly less movement of fluids toward the producing wells in the direction of lower formation permeability. By selectively treating those wells lying in the path of greatest formation permeability with the treating fluid of this invention, the swept area may be made more symmetrical and the sweep efficiency improves significantly. The producing wells lying in the direction of highest formation permeability may be treated first, to reduce asymmetrical development of the swept area, and ultimately the other wells may be treated in a similar fashion, for the purpose of insuring the maximum formation sweep. A process may also be used in application of enhanced oil recovery methods to formations having relatively uniformly oriented permeability in which distortion of the sweep pattern is caused by a drift or flow of fluids across the formation due to pressure differentials across the pattern which is in turn caused by factors other than the injection of the enhanced oil recovery fluid.

DESCRIPTION OF THE PREFERRED EMBODIMENTS

Figure 1:
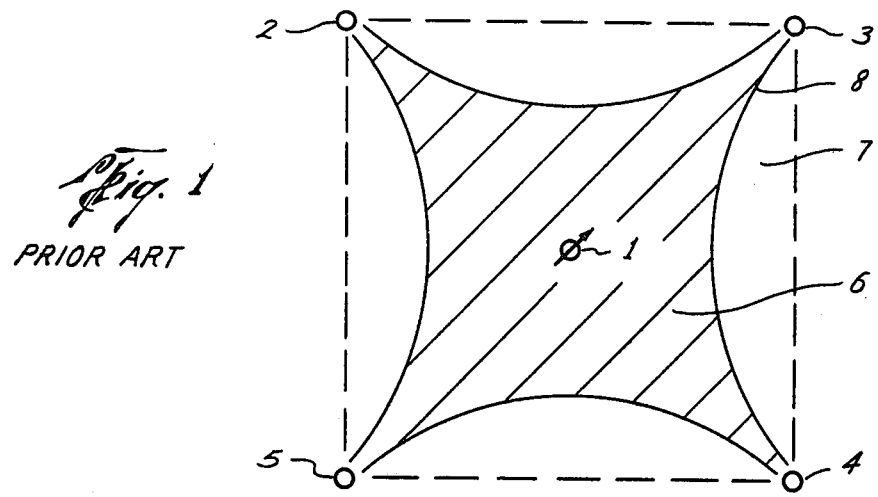
FIG. 1 illustrates the horizontal sweep normally encountered in application of a displacement type enhanced oil recovery method to an inverted five spot according to methods described in the prior art.

The process of this invention concerns a method of treating one or more producing wells in a formation being subjected to a displacement type enhanced oil recovery process, so as to improve the sweep efficiency or horizontal conformance of the displacement process. The problem for which the process of this invention is intended as an improvement is illustrated in FIG. 1, in which central injection well 1 is completed in a portion of a formation, and production wells 2, 3, 4 and 5 are drilled equal distances apart and equal distances from the injector so as to define a square, with each production well on the corner of the square and the injection well at the center of the square. This is a commonly-used pattern employed in waterflooding as well as in chemicalized flooding enhanced oil recovery methods, which pattern is referred to in the literature as an inverted five spot. While this is an economical and convenient method of arranging the injection of production wells, epecially since many fields are drilled in a square grid pattern during the primary production phase of recovery, the sweep efficiency of a process applied using this pattern is relatively poor. The boundary of the recovery area defined by production wells 2, 3, 4 and 5 is shown as a dotted line in FIG. 1. When a fluid is injected into injection well 1, only about 7% of the total area of the recovery area is swept by that fluid. The oil displacement fluid injected into injection well 1 can only recover oil from the portion of the formation through which it passes, which is the shaded area 6 in FIG. 1, so essentially no oil is recovered from the area 7 which is not swept by the oil displacing fluid. The shape of swept area 6 is characteristic for the swept area of well patterns commonly employed in enhanced recovery processes. The cusp area 8 of the swept area adjacent each production well is characteristically narrow. Once the swept area connects with any of the producing wells, further injection of oil displacing fluid into injection well 1 will not expand swept area 6 appreciably, since the permeability of swept area 6 is significantly increased as a result of displacing oil from that portion of the formation. Thus injection of additional oil displacing fluid into injection well 1 will only result in the fluid passing through swept area 6 and will not expand swept area 6 to any significant degree.

Figure 2:
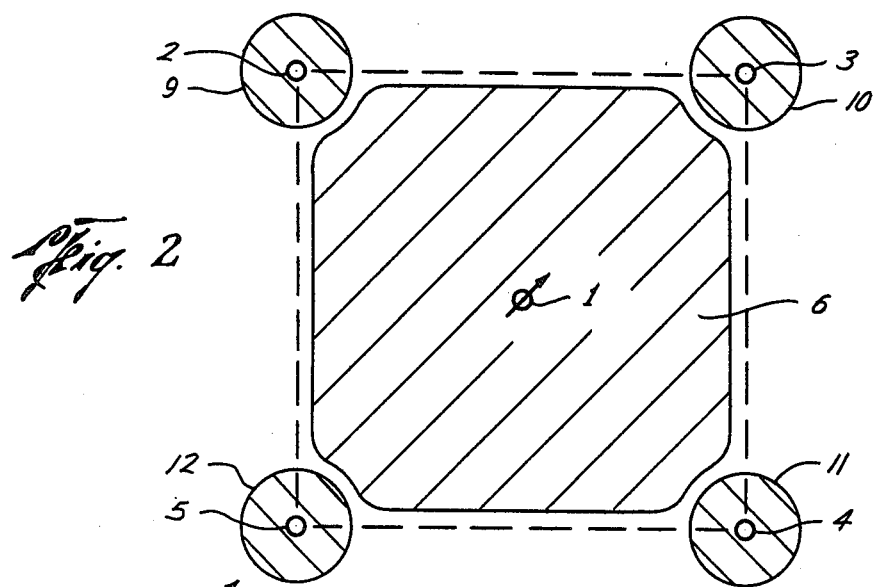
FIG. 2 illustrates the horizontal sweep efficiency resulting from application of the process of this invention, in which diverter fluids have been injected into the producing wells prior to the arrival of a cusp of the injected fluid at the producing wells, thereby improving the percentage of the pattern area swept by fluid, over that attainable in the prior art.

FIG. 2 illustrates one embodiment of the process of our invention, and typical results achieved from application of this embodiment to an inverted five spot pattern such as is shown in FIGS. 1 and 2. The pattern is made up of the same injection well 1 and producing wells 2, 3, 4 and 5 as was the case in FIG. 1. In this embodiment, a diverter fluid has been injected into all four producing wells, forming treated zones 9, 10, 11 and 12 adjacent production wells 2, 3, 4, and 5 respectively. The diverter fluid composition will be described more fully below, but it is sufficient for understanding the method of applying the process of this invention to state only its critical characteristics. The viscosity of the fluid at the time of injection must not be so high as to restrict its entry into the low permeability zones of the formation. Thus a simple high viscosity fluid such as an aqueous solution of hydrophilic polymer, would not be particularly suitable for use in this process, since the viscosity at the time of injection would restrict its entry into the lower permeability strata of the formation. Indeed, in many formations, it would be difficult to inject a viscous fluid into any of the oil producing zones, in sufficient quantity to attain the depth of treatment into the formation desired. It is desired that sufficient fluid be injected so the average distance away from the production well penetrated by the injected diverter fluid is from 5 to 50 and preferably from 10 to 20 feet, in order to insure optimum reshaping of the swept area 6. Larger depths of treatment are desired in application to fields being exploited by means of greater well spacing. As a general guideline, it is desired that the depth of treatment to which the diverter fluid is injected in the producing wells, be from 0.8 to 8 and preferably from 1.5 to 3% of the distance between the production well and the injection well.

The diverter fluid employed in this invention is an aqueous fluid containing a surfactant which is tailored to produce an optimum amount of viscous emulsion, utilizing the oil present in the portion of the formation into which the fluid is injected to form the emulsion. Since the emulsification process utilizes oil in the formation, the viscosity of the emulsion becomes substantially greater than the viscosity of the diverter fluid at the time it is injected into the formation.

If the formation is comprised of essentially a single uniform permeability layer, then the depth of penetration which the diverter fluid achieves into the formation, will be relatively constant from top to bottom. Many formations are comprised of layers of varying permeabilities, and in those instances greater penetration will be achieved in the higher permeability layers, with correspondingly less penetration in the low permeability layers of the formation. This is an advantageous characteristic of our process, since cusping will occur first in the high permeability strata of the formation, and so greater penetration of the diverter fluid for forming the viscous emulsion barrier adjacent the producing well is desired in the high permeability layers, than in the low permeability layers. Moreover, proportionately more fluid will invade the high permeability layers than invades the low permeability layers, which again is an advantageous feature of this process for application to formations comprised of a plurality of strata of varying permeabilities. The existence of these layers should be taken into account in determining the volume of fluid employed, however, in order to insure sufficient fluid is introduced into the formation adjacent each production well to insure a minimum invasion into the low permeability zones of the formation.

The volume of diverter fluid injected into each producing well in applying the process of this invention is proportional to the thickness of the formation at the producing well being treated, the average porosity of the formation interval being treated, the depth of penetration desired (which is determined by the well spacing of the pattern being employed), among other factors. Subject to these comments, the volume of diverter fluid injected into each well should be from 117.5 to 11,750 and preferably from 470 to 1880 gallons per foot of formation thickness with which the production well is in communication (Assumed $\phi = 0.20$).

The diverter fluid may be injected into the producing well at any time prior to the time when the cusp of injected fluid is approaching production well, but preferably the diverter fluid should be injected prior to the time the cusp of injected fluid passes about the midpoint between the injection well and the production well being treated. the diverter fluid may be injected into the producing wells even prior to this time, and may in fact be injected prior to the commencing of injecting the oil displacing fluid into injection well 1.

It can be seen from FIG. 2 that the swept area 6 is substantially greater in this instance, because of application of the process of this invention, than is the swept area 6 illustrated in FIG. 1. The presence of the treated zones 9, 10, 11 and 12 causes the swept area to expand substantially, and retards the formation of cusps at the producing well which is associated with the poor horizontal conformance of conventional displacement processes as is illustrated in FIG. 1.

After maximum development of the swept area, which may expand essentially to the confines of the recovery zone defined by producing wells 2, 3, 4 and 5, a small additional amount of oil may be recovered by treating the producing wells to break the emulsion, thereby permitting unrestricted flow of oil and injected fluids into the producing well. This can be accomplished by injecting any fluid which has the effect of breaking the stable viscous emulsion created in the treated zone adjacent the producing wells. One particularly suitable fluid for this purpose is a low molecular weight alcohol such as a $C_3$ to $C_5$ alcohol, which rapidly breaks the emulsion and permits recovery of the oil that was originally emulsified to form the treated zone, as well as additional oil from the portion of the swept zone around the treated zone. From 11.5 to 1175 and preferably 47 to 188 gallons of alcohol per foot of formation thickness is ordinarily a preferred volume of alcohol to inject into the producing wells for this purpose.

Figure 3:
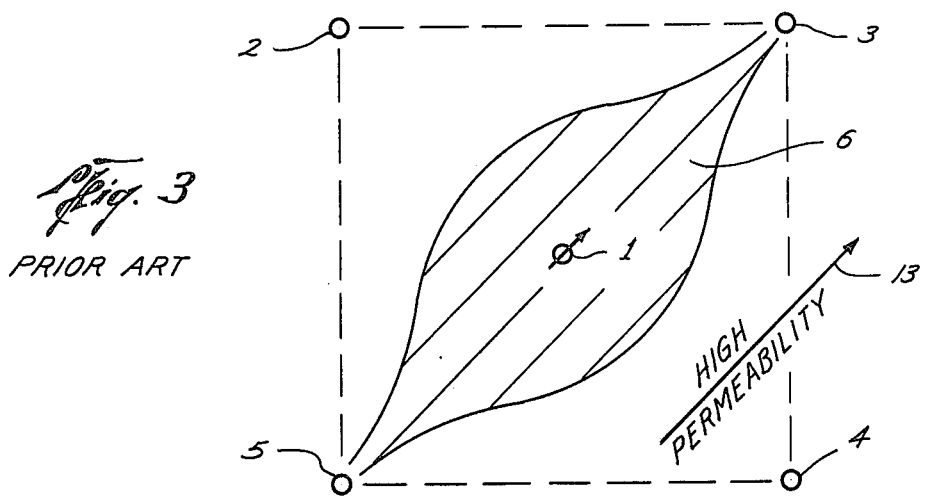
FIG. 3 illustrates the poor sweep efficiency encountered in a displacement type enhanced oil recovery process in which there is a preferred permeability orientation in the formation resulting in even worse sweep efficiency than is illustrated in FIG. 1.

Another embodiment of our invention involves treatment applied to a formation which, unlike the situations described above, exhibit a preferred permeability orientatin. This is illustrated in FIG. 3, illustrating a simple, state of the prior art oil recovery process applied to an inverted five spot similar to that described in FIG. 1, except that the formation penetrated by wells 1-5 has a higher permeability, shown by arrow 13 in FIG. 3, in the general direction of a line between production well 5, injection well 1, and production well 3, than exists in a direction orthogonal to that line, namely through production wells 2-4. This is a situation encountered in field operations with sufficient frequency for it to be a serious problem in enhanced oil recovery operations. It can be seen that cusps forms rapidly in swept area 6 adjacent or connecting with production wells 3 and 5, because fluid flow in the direction of high permeability is more pronounced than it is in the direction of low permeability, i.e. from injection well 1 to wells 2 and 4. Swept area 6 in this instance is even smaller than it is in FIG. 1, and large amounts of formation remain unswept in the zone between injection well 1 and producing wells 2 and 4.

Figure 4:
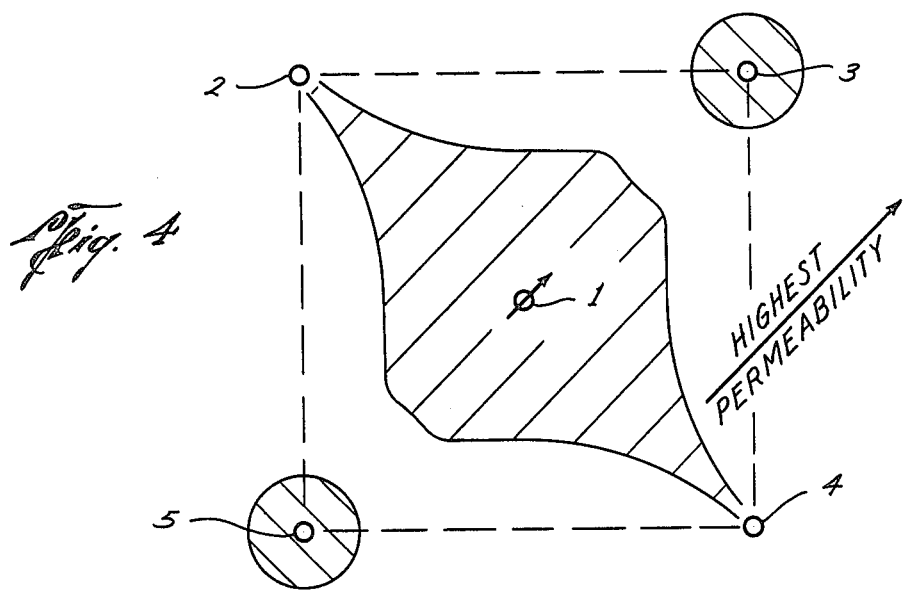
FIG. 4 illustrates how application of the process of this invention to the wells located along the high permeability direction, prevents the distortion of sweep efficiency caused by the preferential permeability orientation of the formation.

The embodiment of our invention especially suitable for application to the above-described situation is illustrated in FIG. 4, in which diverter fluid is injected into producing wells 3 and 5 to form a treated zone containing the high viscosity emulsion, preventing the formation of cusps in that direction, but no diverter fluid is injected into wells 2 and 4. This forces the displacing fluid to move generally toward the wells 2 and 4 rather than predominantly toward wells 3 and 5 as were shown in FIG. 3. After the injected fluid approaches or reaches wells 2 and 4, the treated zone adjacent production wells 3 and 5 may be treated with alcohol or other means to break the emulsion, after which continued injection of fluid into injection well 1 will cause the oil displacement fluid to move more generally in the direction of wells 3 and 5. By this means, the swept area is increased to a level approaching that illustrated in FIG. 1, but is not as good as shown in FIG. 2.

Figure 5:
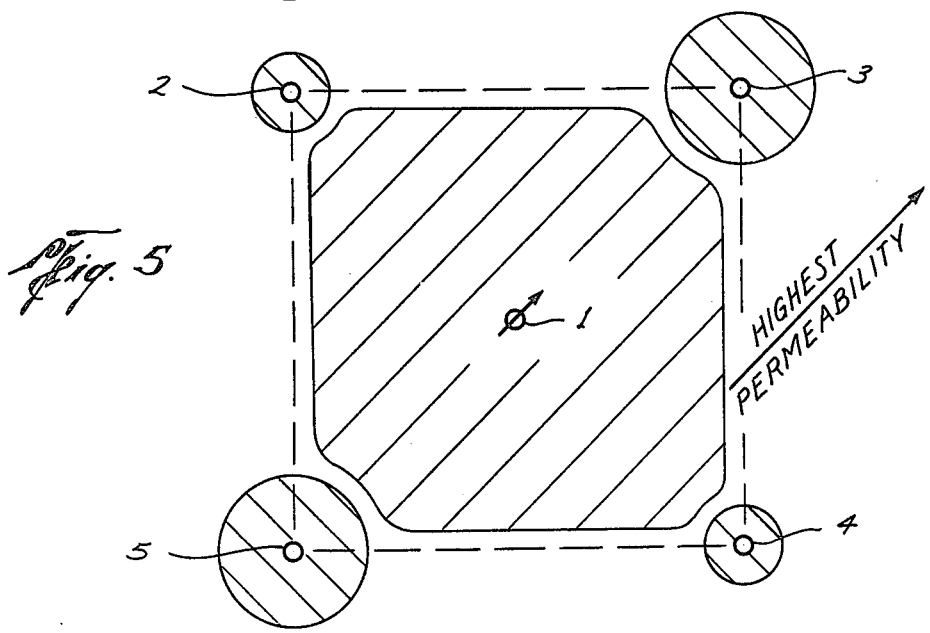
FIG. 5 illustrates a preferred embodiment of this invention applied to a formation having preferential permeability orientation, in which all production wells are treated with diverter fluid, but with the sequence of application to production wells or fluid volumes being adjusted to correct for both asymmetrical sweep and poor sweep efficiency as is experienced in uniform permeability formations.

A preferred method for operating in formations exhibiting preferred permeability orientation such as is shown in FIGS. 3 and 4 is illustrated in FIG. 5. In this instance, all four producing wells are treated with diverter fluid to form a treated zone containing the viscous, in situ generated emulsion, but the amount of fluid injected in wells along the preferred flow paths, i.e. in alignment with the orientation of highest permeability, wells 3 and 5 of this illustration are treated with significantly greater volumes of fluid to extend the treated zone further into the formation away from the wells, than is used in wells 2 and 4. One method of choosing a preferred volume for treating these wells utilizes treating volumes which are roughly proportional to the permeability of the formation in alignment with the wells being treated. That is to say, if a permeability of the formation in a line between wells 3 and 5 is twice as great as the permeability along wells 2 and 4, then the volume of fluid injected into wells 3 and 5 should be approximately twice the volume of fluid injected into wells 2 and 4. Within these guidelines, the treatment levels recommended above are generally satisfactory.

Another embodiment of our invention is applicable to a formation where a natural fluid flow is occurring accross the formation having a known or determinable direction and velocity, which causes a larger cusp to form in the direction of at least one of said producing wells than in the direction of the other producing wells. This embodiment comprises injecting diverter fluid into the well where the larger cusp forms prior to the step of injecting diverter fluid into the other wells. In another embodiment of our invention for application to the same situation, a greater volume of diverter fluid is injected into the well adjacent to which the larger cusp forms than is injected into the other wells.

The diverter fluid injected into the formation in applying the process of this invention is an aqueous liquid e.g. a solution or dispersion containing one or more surfactants, or surface-active agents, which are carefully chosen individually and in the case of multi-component systems, their relative proportions selected on the basis of displaying optimum emulsification characteristics. The aqueous liquid is either oil-free or the oil content is below the level which would increase the viscosity to a value substantially greater than the viscosity of water. Preferably the viscosity of the fluid is no more than twice the viscosity of water. The surfactants which are effective for this purpose, e.g. for forming gross macro-emulsions suitable for reducing the permeability in the treated portion of the formation, are not suitable for low surface tension flooding operations, and will not produce optimum oil displacement in a formation if utilized in a surfactant waterflooding process. The reasons the surfactants suitable for use in the process of this invention are ineffective for waterflooding operations in that when an emulsion is formed, essentially all of the surface active agent molecules where participate in the emulsification reaction, are concentrated at the interface between the discontinuous and continuous emulsion phases, and so few of the surfactant molecules remain in the aqueous solution, and so cannot reduce the interfacial tension between the formation petroleum and the aqueous fluid present in the flow channels as is necessary to achieve efficient low surface tension displacement of petroleum.

It is necessary that the surfactants utilized in the process of this invention be stable and effective for emulsification in an aqueous fluid having a salinity about equal to the average salinity of the aqueous fluid present in the flow channel of portion of the formation into which the diverter fluid is to be injected. Preferably, the surfactant should be identified by tests utilizing actual fluids from the formation, including brine and formation petroleum, since particular characteristics of any of these fluids affect the efficiency of the surfactant for emulsification of formation petroleum and injected aqueous fluid.

Numerous surfactants or combinations of surfactants may be employed in this process. The preferred class of emulsifying surfactant is usually determined by the formation temperature and the salinity and divalent ion concentration of the water present in the portion of the formation being treated.

In fresh water-containing formations, e.g. where the formation water salinity is less than about 15,000 parts per million total dissolved solids, a preferred system comprises from 0.5 to 5.0 percent by weight of petroleum sulfonate whose equivalent weight is from 300 to 500, or a $C_9$ to $C_{18}$ alkyl-substituted sulfonate or alkylaryl sulfonate such as benzene or toluene having at least one $C_9$ to $C_{18}$ alkyl side chain, in combination with from 0.5 to 4.0 percent by weight of a low HLB, low water solubility or water insoluble nonionic surfactant such as an ethoxylated alkanol or an ethoxylated alkylphenol, having from 2 to 8 ethoxy groups per molecule.

In applying the process of this invention to high salinity, high temperature formations, e.g. where the salinity is in excess of 15,000 parts per million total dissolved solids and the temperature exceeds 150° F. (66° C.), the following preferred surfactant mixture should be used.

(1) A sulfonated and ethoxylated surfactant having the following formula:

$$R-(OR')_n-R''SO_3M \qquad (1)$$

wherein R is an aliphatic group, preferably an alkyl, linear or branched, having from 9 to 25 and preferably from 12 to 18 carbon atoms, or an alkylaryl group such as benzene, toluene or xylene having attached thereto at least one alkyl group, linear or branched, having from 9 to 15 and preferably from 10 to 13 carbon atoms; R' is ethylene or a mixture of ethylene and higher molecular weight alkylene such as propylene with relatively more ethylene than higher molecular weight alkylene, n is a number including fractional numbers, from 2 to 10 and preferably from 3 to 7; R'' is ethylene, propylene, hydroxy propylene, or butylene; and M is a monovalent cation such as sodium, potassium, lithium or ammonium.

(2) An organic sulfonate anionic surfactant such as an alkyl sulfonate, alkyaryl sulfonate, a petroleum sulfonate or a mixture thereof. In the case of the alkyl or alkylaryl sulfonate, the alkyl group, which may be linear or branched, will ordinarily contain from 8 to 20 and preferably from 9 to 18 carbon atoms. The petroleum sulfonate is predominantly water soluble, and the average equivalent weight should be from 250 to 600 and preferably from 300 to 500.

The concentration of the alkyl or alkylarylpolyalkoxyalkylene sulfonate surfactant is ordinarily in the range of from about 0.5 to about 4.0 percent by weight. The concentration of the organic sulfonate surfactant should be from about 0.01 to about 10 and preferably from about 0.2 to about 5.0 percent by weight. The ratio of organic sulfonate surfactant to the alkyl or alkylarylpolyalkoxyalkylene sulfonate will ordinarily be from about 0.1 to 1.5, depending on the salinity of the fluid in which it is formulated, which in turn is usually about equal to the salinity of the fluid present in the subterranean formation.

In another embodiment, the fluid contains from 0.5 to 4.0 percent by weight of the ethoxylated and sulfonated surfactant described above, alone or with the organic sulfonate, and additionally contains a water insoluble, low HLB nonionic surfactant such as an ethoxylated $C_{10}$ to $C_{20}$ alkanol or ethoxylated $C_9$ $C_{15}$ alkylphenol containing from 2 to 8 ethoxy groups per molecule. This combination is effective for use in formations containing water whose salinity is from 20,000 to 150,000 parts per million total dissolved solids and whose temperature is from 70° to 180° F.

Another embodiment is suitable for moderate temperature formation containing high salinity water. Where the formation temperature is less than 150° F. (66° C.) and the formation water salinity is from 30,000 to 240,000 parts per million total dissolved solids, the following combination is effective.

(1) From 0.5 to 5.0 percent by weight of a sulfated and ethoxylated surfactant having the following formula:

$$R_aO(R_a'O)_{na}SO_3M_a \quad (2)$$

wherein $R_a$ is an aliphatic group, preferably an alkyl, linear or branched, having from 9 to 25 and preferably from 12 to 18 carbon atoms, or an alkylaryl group such as benzene, toluene or xylene having attached thereto at least one alkyl group, linear or branched, having from 9 to 15 and preferably from 10 to 13 carbon atoms; O is oxygen; $R_a'$ is ethylene or a mixture of ethylene and higher molecular weight alkylene such as propylene with relatively more ethylene than higher molecular weight alkylene; na is a number including fractional numbers, from 2 to 10 and preferably from 2 to 7; S is sulfur; and $M_a$ is a monovalent cation such as sodium, potassium, lithium or ammonium.

(2) A low HLB, essentially water-insoluble non-ionic surfactant having the following formula:

$$R_b(OR_b')_{nb}OH \quad (3)$$

wherein $R_b$ is an aliphatic, such as a branched or linear alkyl, containing from 9 to 25 carbon atoms and preferably from 12 to 18 carbon atoms, or an alkylaryl group such as benzene, toluene or xylene having attached thereto at least one alkyl group, linear or branched, containing from 9 to 15 and preferably from 10 to 15 carbon atoms in the alkyl chain; $R_b'$ is ethylene or a mixture of ethylene and higher alkylene such as propylene with relatively more ethylene than higher alkylene; and nb is a number, either whole or fractional, from 1 to 10 and preferably from 2 to 6.

PILOT FIELD EXAMPLE

For the purpose of illustrating a preferred mode of applying the process of this invention to a particular situation, the following hypothetical field example is supplied.

A subterranean, petroleum-containing formation located at a depth of about 5800 feet is nearing the end of waterflood. The total thickness of the formation is 78 feet. The water present in the formation the salinity of the water present in the formation is about 85,000 parts per million total dissolved solids including 10,000 parts per million divalent ions, i.e. calcium and magnesium. The formation temperature is 109° F. (43° C.). The formation is relatively homogeneous in terms of permeability throughout the vertical thickness, and the average oil saturation in the formation is about 30%.

Surfactant waterflooding is initiated in the formation. The field is drilled on a square grid pattern, and a single 20 acre five spot pattern is selected for the field of pilot experiment. The formation thickness is 15 feet and the porosity is 20%. The distance between producing wells, i.e. the length of each side of the square grid on the corners of which the producing wells are located, is 933 feet. An injection well is located in the center of the square grid. The surfactant waterflooding process utilizes a 0.25 pore volume slug of 0.4% by weight sodium dodecylbenzene sulfonate and 0.6% by weight of a 10.6 mole ethylene oxide adduct of nonyl phenol. This is followed by a 0.1 pore volume slug (1.95 MM gallons) of essentially fresh water containing 1,000 parts per million of a commercially available polysaccharide hydrophilic polymer, which is followed by brine having salinity of 80,000 parts per million total dissolved solids. In order to improve the horizontal sweep efficiency of the displacement process, each of the four producing wells is treated at about the same time surfactant fluid injection is initiated into the central injection well. The treatment comprises injecting 7050 gallons of emulsifying fluid into each producing well. The fluid is water having dissolved therein 1.6% sodium dodecylbenzene triethoxyethylene sulfonate and 0.76% of a three mole ethylene oxide adduct of dodecylphenol, a water insoluble nonionic surfactant. This combination of surfactants produces an optimum viscous emulsion in the formation at the salinity level of the formation water. The injection pressure at each producing well is monitored during the course of injecting the treating fluid into the injection well, and it is noted that the injection pressure increases substantially during the course of injecting the 7050 gallons of fluid, indicating that the fluid is indeed forming a viscous emulsion in the flow channels of the portion of the formation immediately adjacent to the producing well. No additional treatment of the producing well is necessary, and the normal sequence of injecting surfactant fluid, polymer fluid, and then field brine is followed at the injection well. Based on the time elapsed and total volume of fluid injected into the injection well, as of the time surfactant fluid is detected at the producing wells, it is estimated that the horizontal sweep efficiency in this pilot field example is about 85%, which is substantially greater than the 70% that would have been achieved had the process been applied in a conventional manner, without injecting diverter fluid into the producing wells to prevent cusping of injected fluids and resultant poor sweep efficiency.

EXPERIMENTAL SECTION

A series of laboratory tests were conducted to illustrate how slight changes in molecular characteristics of the surfactant affect emulsification effectiveness of certain preferred surfactants. These tests comprised mixing together 5 cc's of oil and 30 cc's of the one percent surfactant solution in an 85 kilogram/meter$^3$ (85,000 ppm) brine. The solutions were heated to a temperature of 109° F. (43° C.) and shaken periodically over an eight hour period. The solutions were then allowed to equilibrate for several days, and the volume of emulsion and total volume of fluid including the emulsion, the oil and the aqueous phase, were observed. The numbers reported in Table I below in the column titled "emulsification ratio" represents the volume of emulsion divided by the total volume of fluid, including emulsion and separate phases of the field brine and any unemulsified oil that may have been present. It can be seen that a change in the number of ethoxy groups of only 0.2 causes a very significant change in the emulsification effectiveness of the surfactant.

TABLE I

| Run | Average number of moles of ethylene oxide per mole of surfactant[1] | Emulsification ratio (volume of emulsion ÷ total fluid volume) |
| --- | --- | --- |
| A | 2.6 | 0.02 |
| B | 2.8 | 0.39 |
| C | 3.0 | 0.02 |
| D | 3.2 | 0.00 |
| E | 3.4 | 0.00 |

[1]One percent dodecylbenzenepolyethoxyhydroxypropylene sulfonate.

While our invention has been described in terms of a number of illustrative embodiments, it is clearly not so limited since many variations thereof will be apparent to persons skilled in the art of oil recovery without departing from the true spirit and scope of this invention. It is our desire and intention that our invention be limited only by those limitations and restrictions appearing in the claims appended immediately hereinafter below.

We claim:

1. In a method of recovering petroleum from a subterranean, petroleum-containing permeable formation, penetrated by at least one injection well and by a plurality of production wells, said formation permeability being different in the direction of at least one of the producing wells from the formation permeability in the direction of at least one other producing well, by an enhanced oil recovery method comprising injecting an oil displacing fluid into the injection well and producing oil and injected fluids from the formation by the producing wells, wherein the improvement for increasing the horizontal sweep efficiency of the oil recovery method comprises:

injecting a predetermined quantity of diverter fluid comprising water having dissolved therein at least one surfactant capable of producing a stable, viscous, oil-in-water emulsion with petroleum present in the flow channels of the portion of the formation adjacent to the production wells, into the production well located along the line of greater formation permeability from the injection well, and injecting a lesser volume into at least one of the wells located along the line of lesser formation permeability prior to the time the oil-displacing fluid reaches the producing well, to form a viscous emulsion in the flow channels of the formation adjacent to said production wells.

2. A method as recited in claim 1 wherein the aqueous liquid is injected into the producing wells prior to the time that the oil-displacing fluid has traveled halfway between the injection well and the producing wells.

3. A method as recited in claim 1 wherein the aqueous liquid is injected into the producing wells at or before the time injection of the oil-displacing fluid into the injection well is begun.

4. A method as recited in claim 1 wherein the volume of liquid injected into each producing well is from 117.5 to 11,750 gallons per foot of formation.

5. A method as recited in claim 1 wherein the volume of liquid injected into each producing well is from 470 to 1,880 gallons per foot of formation.

6. A method as recited in claim 1 wherein the injection well is near the center of a square with one producing well on each corner of the square, and the aqueous liquid is injected into at least two of the producing wells.

7. A method as recited in claim 6 wherein a natural fluid flow is occuring across the formation having a known or determinable direction and velocity, causing a larger cusp to form in the direction of at least one of said production wells than in the direction of said other wells, comprising injecting diverter fluid into the well where the larger cusp forms prior to the step of injecting diverter fluid into the other wells.

8. A method as recited in claim 6 wherein a natural fluid flow is occuring across the formation having a known or determinable direction and velocity, causing a larger cusp to form in the direction of at least one of said production wells than in the direction of said other wells, comprising injecting a greater volume of diverter fluid into the well adjacent to which the larger cusp forms than was injected into the other wells.

9. A method as recited in claim 1 wherein said emulsifying surfactant mixture comprises: (1) an aliphaticpolyalkoxyalkylene sulfonate or alkylarylpolyalkoxyalkylene sulfonate having the following formula:

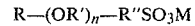

wherein R is an alkyl, linear or branched, having from 9 to 25 carbon atoms or an alkylaryl group selected from the group consisting of benzene, toluene or xylene having attached thereto at least one alkyl group, linear or branched, said alkyl group containing from 9 to 15 carbon atoms; R' is ethylene or a mixture of ethylene and higher molecular weight alkylene with relatively more ethylene than higher molecular weight alkylene; n is a number including fractional numbers from 2 to 10; R'' is ethylene, propylene, hydroxypropylene, or butylene and M is a monovalent cation selected from the group consisting of sodium, potassium, lithium and ammonium, and (2) an organic sulfonate which is at least partially water soluble.

10. A method as recied in claim 9 wherein the emulsifying fluid also contains a third component comprising a nonionic surfactant having the following formula:

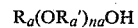

wherein $R_a$ is an aliphatic, including a branched or linear alkyl, containing from 9 to 25 carbon atoms, or an alkylaryl group including benzene, toluene or xylene having attached thereto at least one alkyl group, linear or branched, containing from 9 to 15 carbon atoms, $R_a'$ is ethylene or a mixture of ethylene and higher alkylene such as propylene with relatively more ethylene than propylene; and na is a number either whole or fractional, from 2 to 10.

11. A method as recited in claim 10 wherein the concentration of nonionic surfactant is from about 0.10 to about 5.0 percent by weight.

12. A method as recited in claim 9 wherein R is an alkyl group containing from 12 to 18 carbon atoms.

13. A method as recited in claim 9 wherein R is alkyaryl group and the number of carbon atoms in the alkyl group is from 9 to 13.

14. A method as recited in claim 13 wherein R is alkylbenzene.

15. A method as recited in claim 9 wherein R' is ethylene.

16. A method as recited in claim 9 wherein the value of n is from 2 to 7.

17. A method as recited in claim 9 wherein R'' is ethylene.

18. A method as recited in claim 9 wherein R'' is propylene.

19. A method as recited in claim 9 wherein R'' is hydroxy propylene.

20. A method as recited in claim 9 wherein R'' is butylene.

21. A method as recited in claim 9 wherein the concentration of the aliphaticpolyalkoxyalkylene sulfonate or alkylarylpolyalkoxyalkylene sulfonate is from about 0.01 to about 10.0.

22. A method as recited in claim 9 wherein the concentration of organic sulfonate surfactant is from about 0.5 to about 4.0.

23. A method as recited in claim 1 wherein the emulsifying surfactant comprises (1) an ethoxylated and sulfated surfactant of the following formula:

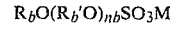

wherein $R_b$ is an alkyl, linear or branched having from 12 to 18 carbon atoms, or an alkylaryl containing from 9 to 15 carbon atoms in the alkyl chain, $R_b'$ is ethylene or a mixture of ethylene and higher alkylene with relatively more ethylene than higher alkylene, nb is a number from 2 to 10, S is sulfur and M is sodium, potassium, lithium or ammonium; and (2) a low HLB, essentially water-insoluble nonionic of the following formula:

$$R_c(OR_c')_{nc}OH$$

wherein $R_c$ is a $C_9$ to $C_{25}$ alkyl, linear or branched, or an alkylaryl containing from 9 to 15 carbon atoms in the alkyl chain, $R_c'$ is ethylene, and nc is a number from 1 to 10.

24. A method as recited in claim 1 wherein the permeability of the formation in the direction of each producing well is about equal, and approximately equal volumes of aqueous liquid are injected into each of the producing wells in the pattern being employed in the enhanced oil recovery method.

25. A method as recited in claim 1 wherein the volume ratio of fluid injected into the producing wells is about equal to the permeability of the formation in the direction of the producing wells.

* * * * *